United States Patent
Yamagata et al.

(10) Patent No.: US 6,533,837 B1
(45) Date of Patent: *Mar. 18, 2003

(54) METHOD OF RECOVERING AND RECYCLING MAGNETIC POWDER FROM RARE EARTH BOND MAGNET

(75) Inventors: Yoshikazu Yamagata, Katano (JP); Fumitoshi Yamashita, Ikoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/677,589

(22) Filed: Oct. 3, 2000

(30) Foreign Application Priority Data

Oct. 4, 1999 (JP) .......................................... 11-282752

(51) Int. Cl.$^7$ ................................................. B22F 9/02
(52) U.S. Cl. .......................................... 75/348; 148/105
(58) Field of Search ........................... 75/348; 148/104, 148/105; 210/695

(56) References Cited

U.S. PATENT DOCUMENTS 6,129,847 A * 10/2000 Wunsch et al. ............. 210/695
6,143,193 A * 11/2000 Akioka et al. ............ 252/62.55

FOREIGN PATENT DOCUMENTS

| EP | 0 999 566 A2 | 5/2000 |
|---|---|---|
| JP | 59-136907 | 8/1984 |
| JP | 5-251222 | * 9/1993 |
| JP | 7-286185 | 10/1995 |
| JP | 7-297014 | 11/1995 |
| JP | 10-55908 | 2/1998 |

* cited by examiner

Primary Examiner—George Wyszomierski
(74) Attorney, Agent, or Firm—Parkhurst & Wendel, L.L.P.

(57) ABSTRACT

A method of recovering magnetic powder from rare earth bond magnet comprising a process of soaking the rare earth bond magnet in a decomposing solution, or holding it in a gas phase of the decomposing solution, containing at least one solvent selected from a group comprising tetralin, naphthalene, 1,4-hydroxynaphthalene, naphthol, biphenyl, 2-hexanone, acetonylacetone, phorone cyclohexanone and methlcyclohexanone, and heating at a temperature not lower than 230° C. A method of recycling recovered magnetic powder by substituting at least a part or all of magnetic powder in the molding compound of a second rare earth bond magnet. For preventing deterioration of magnetic powder from oxidation at surface, air in the decomposition vessel is substituted with nitrogen gas, helium gas and argon gas or is reduced to a pressure not higher than $10^{-2}$ Torr.

16 Claims, 1 Drawing Sheet

METHOD OF RECOVERING AND RECYCLING MAGNETIC POWDER FROM RARE EARTH BOND MAGNET

FIELD OF THE INVENTION

The present invention relates to a method of recovering magnetic powder from rare earth bond magnets and a method of recycling the magnetic powder.

BACKGROUND OF THE PRESENT INVENTION

Rare earth bond magnets formed from a molding compound containing magnetic powder and binders are used in motors, plastic sheets, magnet rollers, magnet sensors or medical devices.

Generally, most magnetic materials are hard and brittle. In the case of cast magnets and sintered magnets, magnetic materials undergo casting, sintering and heating, and grinding to predetermined dimensions. Therefore, it is hard to produce either thin products, or complex-shaped products. Furthermore, problematic cracks or chips occur. To compensate for these disadvantages, bond magnets are used.

Crack resistant, lightweight bond magnets have dimensions of high accuracy, and can be manufactured readily. But, bond magnets have inferior magnetic properties compared to cast magnets or sintered magnets because bond magnets contain binders about 10 to 50 vol %. Recently, as strong magnets like rare earth bond magnet have been provided, production of bond magnets is rapidly increasing. Both thermosetting resin and thermoplastic resin are used for binders. Thermosetting resin is generally used for producing a bond magnet by compression molding. Thermoplastic resin is used for producing a bond magnet by extrusion molding. In a bond magnet produced by compression molding, large amounts of magnetic powder are packed as compared to injection molding. Consequently, the product has improved magnetic properties as compared with the product produced by injection molding.

Japanese Patent Laid Open Publication No. 59-136907 discloses recycling rare earth bond magnet molded by molding compounds containing magnetic powder and binder. Specifically, this reference discloses;

1. When $R_2TM_{17}$ (wherein R designates rare earth elements like samarium and TM designates transition metals like cobalt) is used as Sm—Co magnet based injection molded bond magnets containing thermoplastic resin, sprue and runner can be pulverized and can be recycled in the injection molding again. It is difficult in the case with $RCo_5$.

2. Demagnetizing injection-molding magnet, sprue or runner is advantageous to work.

3. Mixing materials recovered from bond magnets, sprue or runner with raw materials kneaded prevents degradation of magnetic properties and mechanical properties of the bond magnets.

The above prior art describes the efficient manufacturing of Sm—Co based bond magnets by injection molding on an industrial scale.

Japanese Patent Laid Open Publication No. 10-55908 discloses a recycling method of magnetic powder by heating bond magnet and decomposing resin. This method expends a great amount of energy as recovering magnetic powder is done at a temperature as high as 500–1200° C. Further, it is desirable to recover magnetic powder in an inert gas atmosphere like nitrogen, argon, or helium to prevent magnetic powder from oxidizing. Magnetic properties may deteriorate by heating at high temperatures. Moreover, the block shaped recovered magnetic powder needs to be pulverized and classified. This method is also used for recovering bond magnets with thermoplastic resins produced by injection molding or extrusion molding.

However, in a small, injection or extrusion molded magnet of not more than several grams, sprue and runner occupy 80–90% of the weight of materials used, and thus the concentration of sprue and runner is more than the produced magnet in weight. Consequently, both the energy expended on fabrication, and the rate of material deterioration increases. These results are less preferable from the standpoint of saving energy and resources.

Furthermore, it is necessary to adjust volume fraction of magnetic powder generally at not higher than 65 vol % to injection-fill kneaded-plastic fused strand into the cavity of a mold. This conflicts with the objective of increasing the volume fraction of magnetic powder, whereby more rare earth magnetic powder maximizes magnetic properties.

To increase the volume fraction of rare earth magnetic powder, thereby utilizing its original magnetic properties, it is advantageous to strongly compress rare earth magnetic powder with thermosetting resin, for example epoxy resin. In compression molding, neither sprue nor runner are produced, thus improving magnetic properties.

A compression-molded rare earth bond magnet with neodymium based rare earth magnetic powder usually contains an epoxy resin binder, and is widely used for the spindle motors of HDD's, CD-ROM's and/or DVD's. Epoxy resin is generally coated on the neodymium-based bond magnet by spray coating or electro-deposition to prevent rusting.

As rare earth bond magnets with thermosetting resin cannot be refused, the prior art method for recovering and recycling bond magnets with thermoplastic resin cannot be applied to bond magnets with thermosetting resin. Therefore, the art on recycling of rare earth bond magnets by compression-molding a molding compound containing rare earth magnetic powder and thermosetting resin like epoxy resin has not been disclosed.

Rare earth elements in rare earth bond magnets are expensive. It is desirable to recover and recycle them for effective resource usage. However, as mentioned above, only bond magnets using thermoplastics are concerned in the prior art recovering technology. In the prior art recovering technology, pulverizing and heating treatment are necessary, thus possibly deteriorating the magnetic properties of the magnetic powder. Therefore, the prior art is deficient in recovering.

For recycling magnetic powder in the bond magnet with thermosetting resin, resin powder and magnetic powder are separated by fine pulverizing and specific-gravity separating. However, particle diameter of magnetic powder becomes small, and fine particle powders increase by pulverizing. Thus, properties of magnetic powder are destroyed or decreased. Further, it is hard to separate completely resin powder and magnetic powder and to recover 100% of magnetic powder.

The purpose of the present invention is to provide a method of recovering magnetic powder readily with little deterioration of magnetic properties and to provide a method of recycling the recovered magnetic powder for both of rare earth bond magnets using thermoplastic resin and thermosetting resin as the binder.

SUMMARY OF THE PRESENT INVENTION

The present invention provides a recovering method of magnetic powder comprising the steps of soaking rare earth bond magnet in a decomposing solution containing at least one solvent selected from the group consisting of tetralin, naphthalene, methylnaphthalene, 1,4-hydroxylnaphthalene, naphtol, biphenyl, 2-hexanone, acetonylacetone, phorone, cyclohexanone and methylcyclohexanone and then heating at a temperatures of 230° C. or higher. The other process comprises the step of holding rare earth bond magnets in the gas phase of the decomposing solution and then heating at a temperatures of 230° C. or higher. The present invention also provides a recycling (or re-use) method of recovered magnetic powder, which is recycled in at least a part or all of magnetic powder contained in molding compound for molding rare earth bond magnet.

For preventing deterioration by surface oxidation of magnetic powder, it is preferable to substitute the air in the vessel with at least one of nitrogen, helium and argon , or to evacuate inside of the vessel to $10^{-2}$ Torr or lower after putting rare earth bond magnet into a decomposition vessel. Adding antioxidant or reducing agent into the decomposing solution is preferable to enhance prevention of deterioration by surface oxidation of magnetic powder.

To maintain the magnetic properties of bond magnets, the amount of recovered magnetic powder substituting the magnetic powder in the molding compound should be preferably 20 wt % or less.

DESCRIPTION OF THE PREFERRED EMBODIMENTS

Figure 1:
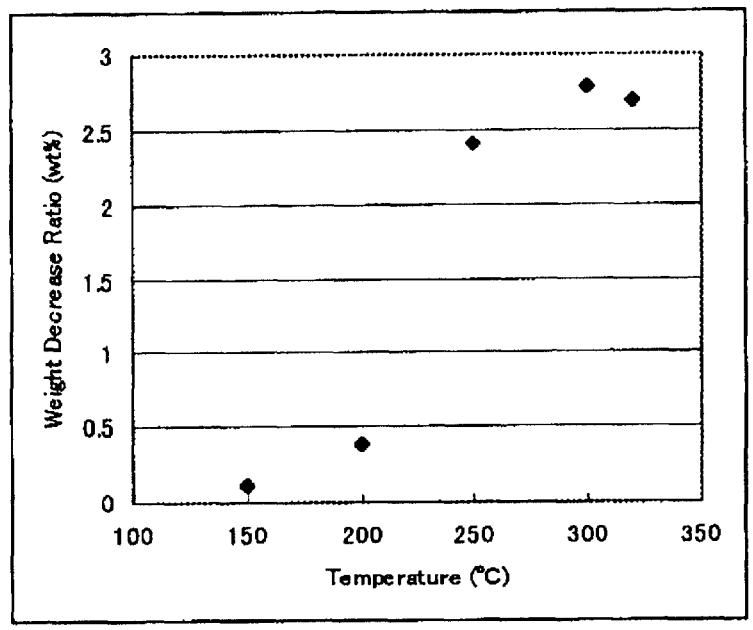
FIG. 1 shows the effect of temperature on decomposition of a bonded magnet.

Binders used in the present invention preferably contain at least one resin selected from the group consisting of epoxy resin, polyester resin, polyamide resin, polyurethane resin, and phenolic resin from the standpoint of decomposition properties of resins. When binders in the bond magnet were thermosetting resin, recovering magnetic powder was impossible according to the prior art, therefore, the effects of the present invention are substantially significant. Therefore, binders are preferably thermosetting resins.

Today, isotropy neodymium based magnetic powder is widely used as rare earth magnetic powder. Bond magnets containing the isotropy neodymium based magnetic powder achieve commercial effects. Further, magnetic powder with soft magnetic phase and hard magnetic phase is highly resistant to deterioration from oxidation and is suitable for use in bond magnets.

Magnets widely used in miniature-size motors are ring shaped rare earth bond magnet made by compression molding and coated with epoxy resin. As the coating can also be simultaneously decomposed by the present invention, it is unnecessary to first remove the coating.

To efficiently recycle magnetic powder finely pulverized by compression molding, it is preferable that magnetic powder recovered from rare earth bond magnets produced by compression molding is recycled in a part of magnetic powder used in rare earth bond magnets produced by injection molding.

According to the present invention, resins serving as a binder of magnetic powder in the rare earth bond magnet decompose in the liquid phase, or in the gas phase of the decomposing solution, the solution includes solvents such as tetralin, so that the rare earth bond magnet becomes collapsed, or comes to be easily collapsed. Additionally, the magnetic powder and at least part or all of resin are separated. Consequently, the magnetic powder is recovered. The recovered magnetic powder is used for substituting at least a part or all of magnetic powder in the molding compound before molding and recycled.

For magnetic powder used in the present invention, any magnetic powder containing rare earth elements generally used in rare earth bond magnets can be used. Rare earth magnetic powders, such as Sm—Co based magnetic powder, Sm—Fe—N based magnetic powder, and Nd—Fe—B based magnetic powder can be used. As rare earth elements easily deteriorate by oxidation, rare earth magnetic powders are hard to recycle without deteriorating magnetic properties. Exchange-spring magnetic powder containing soft-magnetic phase and hard-magnetic phase is more easily recovered and recycled, because the exchange spring magnetic powder is highly oxidation-resistant compared to normal rare earth magnetic powder. Surface-treated magnetic powder such as silane-treated magnetic powder can also be used.

Both thermoplastic resin and thermosetting resin can be used as binders in the present invention. However, it is preferable to use resins with ester bond, amide bond, or ether bond. For example, polyamide resin such as 6-nylon or 12-nylon, polyethylene terephthalete, polybuthylene terephthalete, ethylene-ethylacrylate copolymer, ethylen-vinylacetate copolymer, epoxy resin, unsaturated polyester resin, polyurethane resin and phenolic resin are preferably used. Furthermore, rubber or thermoplastic elastmer can be used for a binder.

A bond magnet with thermosetting resin cannot be heat fused in contrast to a bond magnet with thermoplastic resin. Thus the magnet with thermosetting resin could not be recycled by the prior art method. The recovering method of the present invention is useful for recovering magnetic powder from a bond magnet with thermosetting resin.

Other fillers may be added into the rare earth bond magnet to reinforce. Mica, many kinds of whiskers, talc, clay, glass balloon, montmorillonite, silicic acid, kaolinite, silica, diatomaceous earth, glass fiber, carbon fiber, asbestos fiber, nylon fiber, polyethylene fiber can be used as a filler.

Release agents or wax can be added to the rare earth bond magnet to facilitate molding.

Examples of release agents include stearic acid, zinc stearate, and calcium stearate. Examples of waxes include Hoechst wax, carnauba wax, and paraffin wax.

Antioxidants such as hydrazine based antioxidant may be added to the magnet.

A decomposing solution contains at least one solvent selected from the group consisting of tetralin, naphthalene, methylnaphthalene, 1, 4-hydroxynaphthalene, 4-hydroxynaphthalene, naphthol, biphenyl, 2-hexanone, acetonylacetone, phorone, cyclohexanone, and methylcyclohexane.

For achieving a higher reaction rate of decomposition, it is preferable that the decomposing process is processed at high temperatures. It is more preferably the decomposition to be processed at 230° C. or higher, because the reaction rate becomes substantially high.

For preventing deterioration of magnetic powder by oxidation, it is preferable to substitute air with inert gases such as nitrogen, helium or argon in the reaction vessel, or to reduce pressure in the reaction vessel to $10^{-2}$ Torr or lower by a vacuum pump or the like. The present invention is described below with specific examples.

EXAMPLE 1

Cylindrical Molding Production 1

1.5 parts by weight of acetone, 1.5 parts by weight of epoxy resin and 1.3 parts by weight of block isocyanate are added to 100 parts by weight of magnetic powder of an alloy composition $Nd_{10.5}Fe_{83.5}Co_{0.5}B_{5.5}$, and the compound is kneaded and kept at a temperature of 80° C. for an hour to evaporate acetone in the compound. The produced composition is pulverized to particles no larger than 250 micrometers in a diameter.

100 parts by weight of the pulverized powder is mixed with 0.05 parts by weight of calcium stearate. A cylindrical molding of 5 mm diameter and 5 mm high is produced by compression molding 0.5 grams of the mixture in the mold at about 8 ton/$cm^2$ of pressure, and thus sample 1 is produced by curing the molding at a temperature of 150° C. for an hour.

Sample 1 is magnetized by pulses generating 50 kOe of magnetic field. Obtained Sample 1 shows 6.80 kG of residual magnetization Jr, 7.56 kOe of coercive force Hej, and 9.15 MG.Oe of maximum energy product Bhmax by VSM measuring.

Decomposition Treatment 30 pieces of sample 1 are put into a pressure vessel and 100 ml of tetralin is poured into the vessel. A vacuum pump is coupled to a nozzle of the vessel and then air in the vessel is evacuated to $10^{-2}$ Torr or below. Samples 1 are soaked in tetralin for two hours while heating the pressure vessel at a temperature of 300° C. and change of a condition of sample 1 is observed. Sample 1 is also treated at temperatures of 250° C. and 320° C. as well as at 300° C. and treated also at 150° C. and 200° C. for comparison. Each of the treated samples are cleaned, dried and measured their weight to obtain a rate of weight decrease by treating.

The results are shown in Table 1. Relationship between a weight loss and treatment temperature is shown in FIG. 1.

TABLE 1

| | Treatment Temperature () | | | | |
|---|---|---|---|---|---|
| | 150 | 200 | 250 | 300 | 320 |
| Sample condition | keep shape partially cracked | keep shape partially cracked | Do not keep shape Naturally collapsed, Pulverized | Do not keep shape Naturally collapsed, Pulverized | Do not keep shape Naturally Collapsed, Pulverized |
| Weight loss (wt %) | 0.10 | 0.38 | 2.40 | 2.78 | 2.69 |

When sample 1 is treated at a temperature of 250° C. or higher by soaking in a decomposing solution consisting of tetralin, sample 1 is collapsed because epoxy resin of binder in a bond magnet is decomposed chemically. Consequently, the sample could not keep the shape by itself and collapsed. It is determined by rate of weight loss that most of resin is decomposed. Decomposition of resin in the example was also confirmed by infrared spectrochemical analysis.

FIG. 1 shows that most of resin is decomposed sharply in temperature range between 200 and 250° C. Therefore, it is considered that treatment temperature for decomposition should be higher than 230° C., preferably 250° C. or higher.

As described above, epoxy resin is decomposed rapidly by soaking it in the decomposing solution composing tetralin, and heating at a temperature of 230° C. or higher.

Magnetic Powder Recycling

Sample powder obtained by decomposing method described above at a temperature of 300° C. is used to substitute 10 wt %, 20 wt % and 40 wt % of magnetic powder in the molding compound used in cylindrical molding production 1 described above and moldings are produced under the same condition. Sample powder treated at a temperature of 300° C. is also used to substitute 100% magnetic powder in the molding compound of cylindrical molding production 1 and recycled to produce another moldings. These rare earth bond magnet moldings are magnetized by pulses generating 50 kOe of magnetic field and then their residual magnetization Jr, coercive force Hej and maximum energy product Bhmax were measured by VSM. The results are shown in FIG. 2.

Figure 2:
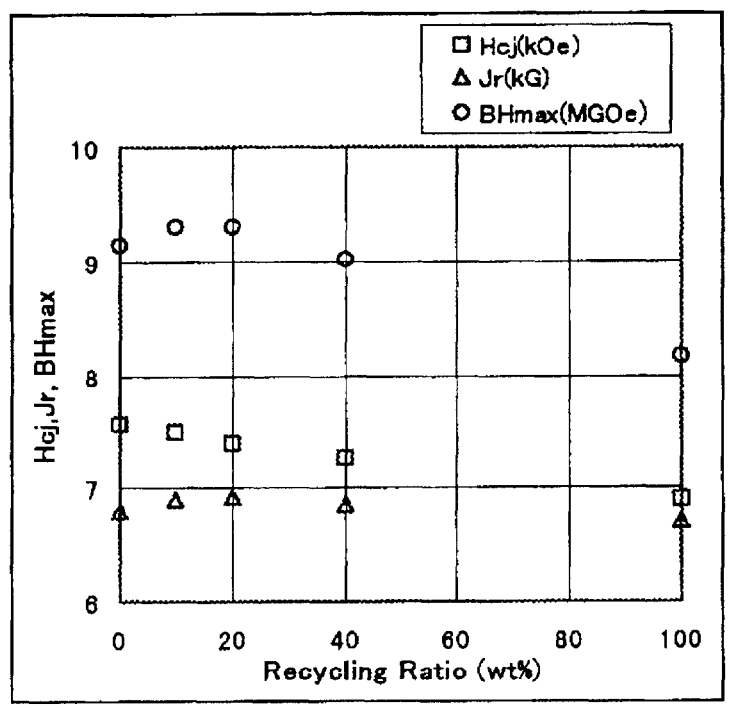
FIG. 2 shows the effect of recycle rate of magnetic powder on magnetic properties of a bonded magnet.

FIG. 2 shows the recovered magnetic powder can be recycled with very little deterioration of magnetic properties unless the rate of recycling is less than 20%. Though, for 40% or 100% of rate of recycling, maximum energy product becomes lower, coercive force 90% or higher of its original value is maintained. Consequently, 40% or 100% recycled rare earth bond magnet can be sufficiently adaptable to a rare earth bond magnet with a little deterioration of magnetic properties.

Sample powder treated at 300° C. is observed by a scanning electron microscope and analyzed by Auger electron spectrochemical analysis. The result shows that residue of resin is very little in the sample powder and oxidation on the surface of each particle of magnetic powder is about the same level as the original magnetic powder. It is obvious that magnetic powder is practically not oxidized by decomposing treatment of the present invention. However, magnetic powder with small-diameter particle increases. Table 2 shows the distribution of particle sizes of original magnetic powder and that of magnetic powder recovered after treatment. It is considered that difference of the distribution of particle sizes is caused by pulverization of magnetic powder when molded by compression molding in the present example.

TABLE 2

| | Particle diameter ($\mu$m) | | | | |
|---|---|---|---|---|---|
| | 150 or larger | 106–150 | 75–106 | 53–75 | 53 or smaller |
| Original powder | 1.1 | 36.8 | 30.7 | 12.1 | 19.3 |
| Recovered powder | 0.3 | 8.0 | 27.9 | 21.7 | 42.1 |

It is obvious from the above results that magnetic powder can be recovered and recycled with very little deterioration in magnetic properties by treatment of rare earth bond magnet in the present invention.

When naphthalene or 1,4-hydroxynaphthalene is used instead of decomposing solution in this example, moldings can be collapsed at about the same treating temperature and time, and magnetic powder can be recovered.

For comparison, when water is used instead of the decomposing solution and sample 1 is treated at 300° C. for two hours, some cracks in the sample occur, but its weight does not decrease and resin is not decomposed.

When a sample is treated at 300° C. for two hours in air, some small cracks occur and roughness is observed on the surface of the sample, however the sample keeps its cylindrical shape and its weight hardly decreases. Only heating sample 1 at 300° C. has no effect on decomposition treatment.

EXAMPLE 2

First, after adding 100 ml of tetralin in a pressure vessel, 20 pieces of sample 1 of example 1 is placed into a fishnet basket suspended in the upper part of the pressure vessel. In this example, sample 1 is in a condition of not soaking in tetralin. Next, a vacuum pump is coupled to a nozzle of the pressure vessel and the pressure vessel is evacuated to not higher than $10^{-2}$ Torr. After the pressure vessel is heated to 300° C. and undergoes decomposition treated for three hours, changes of the condition of the sample are observed. The treated sample is cleaned with acetone and dried, then its weight measured to determine a rate of weight decrease by the treatment.

Consequently, the sample keeps its cylindrical shape. However, the sample can be collapsed readily with tweezers, and is during acetone-cleaning. The rate of weight loss was 2.34%. Most of binder decomposes, and is removed from the sample by vapors of tetralin. According to the present example, it is understood that the sample is sufficiently decomposable even when in a state of not soaking in the solvent of the decomposing solution, i.e. the sample is sufficiently decomposed in a gas phase of the solvent. Decomposition in the gas phase of the solvent takes a little longer time than in the solvent. However, it might be advantageous as gas phase decomposition eliminates post decomposition treatment, for example acetone cleaning.

Recycle

The second molding is magnetized by pulses generating 50 kOe of magnetic field. It shows 6.67 kG of residual magnetization Jr, 6.81 kOe of coercive force Hej, and 8.03 MG.Oe of maximum energy product Bhmax by VSM measuring. The properties deteriorate only a little compared with the 100% recycled molding of example 1, but they both have about equal magnetic properties. Therefore, the molding of the present example is sufficiently reusable.

EXAMPLE 3

Cylindrical Molding Production 2

92 parts by weight of exchange-spring magnetic powder made of $Fe_3B/Nd_2Fe_{14}$, 8 parts by weight of 12-nylon powder, and 0.3 parts by weight of ethylenediamine derived wax are mixed and kneaded at 250° C. by a single-spindle extruder with a screw diameter of 20 mm, and pellets are produced by hot-cutting plastic-magnet-molten-strand extruded from a die head.

The pellet produced above is pulverized. 0.5 grams of the pulverized powder is put in the metal mold heated at 200° C., and compression-molded by applying a pressure of 500kg/cm² to obtain a cylindrical molding (sample 2) with 5 mm diameter and 5 mm high.

The sample 2 is magnetized by pulses generating 50 kOe of magnetic field and has magnetic properties: 6.52 kG of residual magnetization Jr, 3.37 kOe of coercive force Hej and 5.31 MG.Oe of maximum energy product BH max by VSM measuring.

Decomposition Treatment

First, 20 pieces of sample 2 are put into a pressure vessel and 100ml of naphthalene is added. Next, air in the pressure vessel is substituted with nitrogen. The pressure vessel is heated at 300° C. and sample 2 is soaked in naphthalene for two hours. Change of condition of sample 2 is observed.

The treated sample is acetone-cleaned and dried, then, the weight of the sample is measured to determined rate of weight decrease by the treatment. As a result, sample 2 is completely naturally-collapsed. The rate of weight loss is 7.8 wt %.

Magnetic Powder Recycling

Sample powder decomposed in the present example is used for substituting 100% of exchange-spring magnetic powder of cylindrical molding production 2, and a second molding of this example was produced.

The rare earth bond magnet molding is magnetized by pulses generating 50 kOe of magnetic field and shows magnetic properties 6.53 kG of residual magnetization Jr, 3.37 kOe of coercive force Hej, and 5.31 MG.Oe of maximum energy product BHmax by VSM measuring.

In this example, both of coercive force and maximum energy product only slightly deteriorate as compared with example 1. It is considered that the deterioration in magnetic properties practically does not occur by using exchange-spring-magnetic powder, which magnetic powder is practically not oxidized by oxidation.

In this example, naphthalene is used as a decomposing solution. At least any one solvent selected from the group consisting of decomposing solutions as shown above may be contained in the decomposing solution. A temperature of decomposing solution during decomposing is at least 230° C. or higher preferably, but not necessarily limited to values determined in the example.

In the example above, epoxy resin and nylon resin are used as binders, however polyethylene terephthalete, polybuthylene terephthalete, ethylene-ethylacrylate copolymer, ethylene-vinylacetate copolymer, ethylene-vinylalcohol copolymer, unsaturated polyester resin, polyurethane resin, and phenolic resin may be used as binders. Moreover, a composition ratio of resin and magnetic powder is not necessarily limited to the values in the examples above.

In the examples above, neodymium based magnetic powder is used for rare earth bond magnet, however any other magnetic powder can be used in the present invention.

A treated rare earth bond magnet molding is not only cylindrically shaped, but also any other shape, such as ring or horse-shoe-shape, can be used.

The rare earth bond magnet crushed to pieces to easy-to-work size or pulverized for easy decomposing treatment may be used.

As described above, when using the method of decomposition treatment of rare earth bond magnet according to the present invention, binders can be decomposed and magnetic powder can be recovered readily.

Through a process of soaking a rare earth bond magnet which is produced by molding a compound containing at least magnetic powder and binder, in the decomposing solution containing at least one solvent selected from the group consisting of tetralin, naphthalene, cyclohexanone, and the like or holding in the gas phase of the decomposing solution, and through a process of heating the decomposition vessel to not lower than 230° C., magnetic powder can easily be recovered by decomposition of the binding resin.

Moreover, recycling the recovered magnetic powder for substituting a part or all of magnetic powder in the molding compound can decrease waste and use resources efficiently.

According to the present invention, about 100% magnetic powder recovery is possible with very little deterioration of magnetic properties caused from heating, pulverization and oxidation. Therefore, the method of recovering resources in the present invention is industrially and economically effective. A rare earth bond magnet molding containing thermosetting resin as a binder could not be recycled by the prior art, but it can be decomposed readily by the present invention and magnetic powder recovered and recycled. Consequently, the present invention provides an effective method for recovering resources.

What is claimed is:

1. A method of recycling magnetic powder comprising the steps of:

holding a coated compression molded rare earth bond magnet in one of a decomposing solution or a gas phase of said decomposing solution containing at least one solvent selected from the group consisting of tetralin, naphthalene, methylnaphthalene, naphthol, biphenyl, 2-hexanone, phorone, cyclohexanone, and methyl cyclohexanone;

heating at a temperature not lower than 230° C.; and recycling magnetic powder recovered from said coated compression molded rare earth bond magnet in magnetic powder in a second rare earth bond magnet.

2. The method of recycling the magnetic powder of claim 1, wherein an atmosphere, in which said coated compression molded rare earth bond magnet is held and heated comprises at least one gas selected from the group consisting of nitrogen gas, helium gas and argon gas and reduced air not higher than $10^{-2}$ Torr.

3. The method of recycling the magnetic powder of claim 1, wherein said decomposing solution contains one of an antioxidant or reducing agent.

4. The method of recycling magnetic powder of claim 1, wherein an amount of said recovered magnetic powder recycled is not more than 20 wt. % of magnetic powder in said second rare earth bond magnet.

5. The method of recycling magnetic powder of claim 1, wherein a binder of said coated compression molded rare earth bond magnet contains at least one resin selected from the group consisting of epoxy resin, polyester resin, polyamide resin, polyurethane resin and phenolic resin.

6. The method of recycling magnetic powder of claim 1, wherein a binder of said coated compression molded rare earth bond magnet is a thermosetting resin.

7. The method of recycling magnetic powder of claim 1, wherein said magnetic powder includes a soft magnetic phase and a hard magnetic phase.

8. The method of recycling magnetic powder of claim 1, wherein said magnetic powder is isotropic neodymium based magnetic powder.

9. A method of recycling magnetic powder comprising the steps of:

holding an injection molded rare earth bond magnet in one of a decomposing solution or a gas phase of said decomposing solution containing at least one solvent selected from the group consisting of tetralin, naphthalene, methylnaphthalene, naphthol, biphenyl, 2-hexanone, phorone, cyclohexanone, and methyl cyclohexanone;

heating at a temperature not lower than 230° C.; and recycling magnetic powder recovered from said injection molded rare earth bond magnet in magnetic powder in a second rare earth bond magnet.

10. The method of recycling the magnetic powder of claim 9 wherein an atmosphere, in which said injection molded rare earth bond magnet is held and heated comprises at least one gas selected from the group consisting of nitrogen gas, helium gas and argon gas and reduced air not higher than $10^{-2}$ Torr.

11. The method of recycling the magnetic powder of claim 9, wherein said decomposing solution contains one of an antioxidant or reducing agent.

12. The method of recycling magnetic powder of claim 9, wherein an amount of said recovered magnetic powder recycled is not more than 20 wt % of magnetic powder in said second rare earth bond magnet.

13. The method of recycling magnetic powder of claim 9, wherein a binder of said injection molded rare earth bond magnet contains at least one resin selected from the group consisting of epoxy resin, polyester resin, polyamide resin, polyurethane resin and phenolic resin.

14. The method of recycling magnetic powder of claim 9, wherein a binder of said rare earth bond magnet is a thermosetting resin.

15. The method of recycling magnetic powder of claim 9, wherein said magnetic powder includes a soft magnetic phase and a hard magnetic phase.

16. The method of recycling magnetic powder of claim 9, wherein said magnetic powder is isotropic neodymium-based magnetic powder.

* * * * *